United States Patent
Tezuka et al.

(10) Patent No.: US 11,315,284 B2
(45) Date of Patent: Apr. 26, 2022

(54) IMAGE DISPLAY APPARATUS AND RADIATION IMAGING SYSTEM

(71) Applicant: Konica Minolta, Inc., Tokyo (JP)

(72) Inventors: Hidetake Tezuka, Tachikawa (JP); Masahiro Kuwata, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 36 days.

(21) Appl. No.: 16/551,233

(22) Filed: Aug. 26, 2019

(65) Prior Publication Data
US 2020/0074677 A1   Mar. 5, 2020

(30) Foreign Application Priority Data
Sep. 3, 2018  (JP) .............................. JP2018-164485

(51) Int. Cl.
  *G06K 9/00*   (2022.01)
  *G06T 7/73*   (2017.01)
  *G06T 11/60*   (2006.01)
  *G06T 7/00*   (2017.01)

(52) U.S. Cl.
  CPC ............... *G06T 7/74* (2017.01); *G06T 7/97* (2017.01); *G06T 11/60* (2013.01); *G06T 2207/10016* (2013.01); *G06T 2207/10116* (2013.01); *G06T 2207/20092* (2013.01); *G06T 2207/30008* (2013.01)

(58) Field of Classification Search
  CPC . G06T 7/74; G06T 11/60; G06T 2207/10116; G06T 2207/20092
  See application file for complete search history.

(56) References Cited

U.S. PATENT DOCUMENTS

| | | | |
|---|---|---|---|
| 2007/0016016 A1* | 1/2007 | Haras | G06T 7/0012 600/431 |
| 2013/0184537 A1* | 7/2013 | Konuma | A61B 5/0033 600/300 |
| 2016/0128649 A1* | 5/2016 | Miyazawa | A61B 6/463 378/21 |
| 2016/0300349 A1* | 10/2016 | Fonte | A61B 6/5217 |

(Continued)

FOREIGN PATENT DOCUMENTS

| | | |
|---|---|---|
| JP | 2005-167377 A | 6/2005 |
| JP | 2016186736 A | 10/2016 |

(Continued)

OTHER PUBLICATIONS

JPO, Office Action/Search Report for the related Japanese Patent Application No. 2018-164485, dated Feb. 16, 2021, with English translation.

*Primary Examiner* — Atiba O Fitzpatrick
(74) *Attorney, Agent, or Firm* — Lucas & Mercanti, LLP

(57) ABSTRACT

An image display apparatus includes a display which can display an image; and a hardware processor. The hardware processor obtains image data of a dynamic image or a moving image including a plurality of frames generated by a radiation imaging apparatus. The hardware processor displays on the display as a failure image at least one failure frame included in the dynamic image or the moving image based on the obtained image data or analyzed image data obtained by analyzing the image data, the failure frame including a reason why the dynamic image or the moving image cannot be provided for diagnosis.

18 Claims, 8 Drawing Sheets

(56) References Cited

U.S. PATENT DOCUMENTS

| | | | | |
|---|---|---|---|---|
| 2017/0020470 A1* | 1/2017 | Tezuka | ............... | A61B 6/542 |
| 2019/0287241 A1* | 9/2019 | Hill | ............... | A61B 6/5282 |
| 2019/0370956 A1* | 12/2019 | Jackson | ............... | A61B 6/541 |

FOREIGN PATENT DOCUMENTS

| | | |
|---|---|---|
| JP | 2017-039007 A | 2/2017 |
| JP | 2017035294 A | 2/2017 |
| JP | 2017144075 A | 8/2017 |
| JP | 2018-057696 A | 4/2018 |

\* cited by examiner

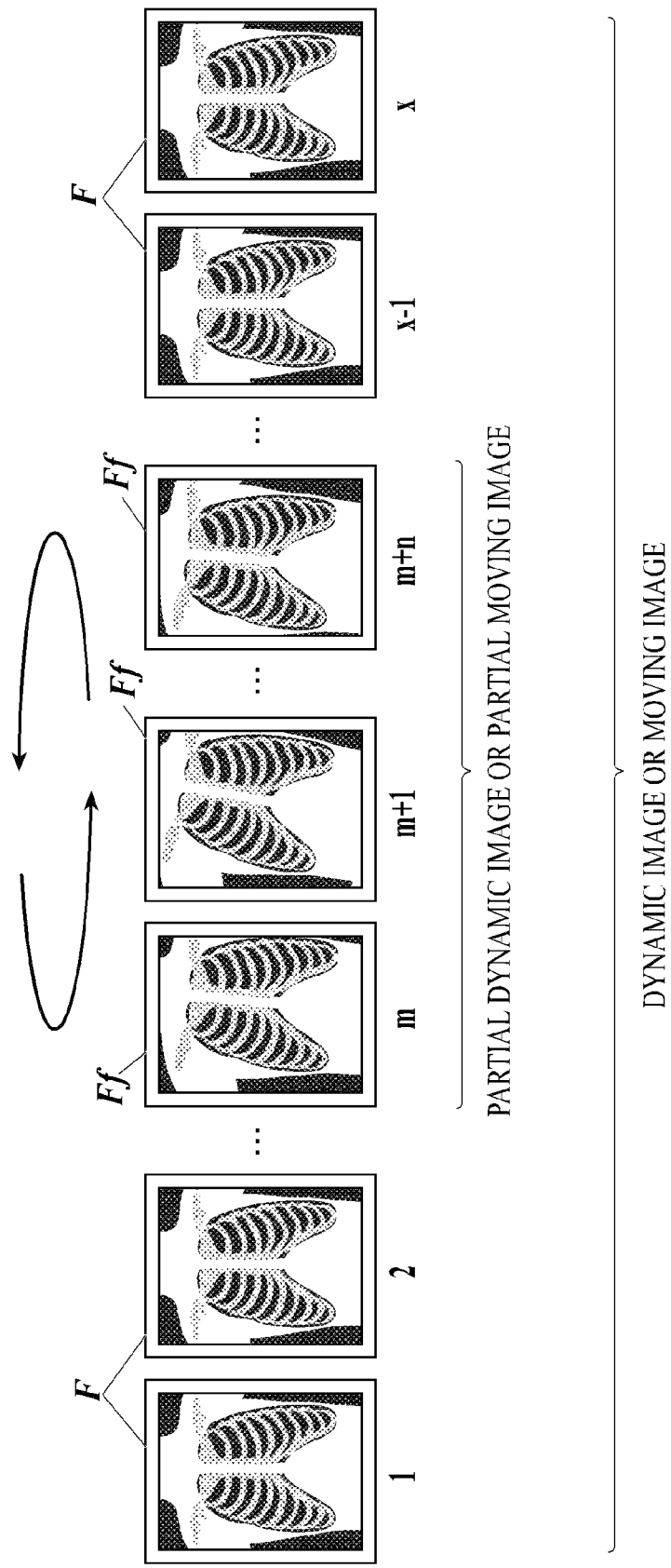

IMAGE DISPLAY APPARATUS AND RADIATION IMAGING SYSTEM

BACKGROUND

Technological Field

The present invention relates to an image display apparatus and radiation imaging system including such image display apparatus.

Description of the Related Art

When a radiation image is imaged, failure can be seen in generating a suitable radiation image due to mistakes in setting the imaging condition performed in advance and positioning, or the patient moving the body (hereinafter referred to as failure). Usually in such case, the generated radiation images are considered to be images which cannot be supplied for diagnosis (hereinafter referred to as failure image) and imaging is usually performed again.

Unlike failure in normal imaging using visible light in which failure images are easily deleted, in the field of imaging radiation images, the image data of the failure images are rarely deleted in order to reduce unnecessary exposure to the patient as much as possible. For example, the failure images are used to analyze the reason for the failure (JP 2016-186736) or are stored with the reason for the failure (JP 2017-035294, JP 2017-144075). As described above, failure images are used to help improve future imaging.

There are many applications in the field of techniques for management of failure images to be able to confirm the failure images on the screen for the purpose of reducing similar failures in the next opportunity of imaging.

Lately, imaging of dynamic images including a plurality of frames is performed using a radiation imaging apparatus which can repeatedly generate image data within a short period of time. However, failure in such imaging of the dynamic image may occur due to the subject moving during the imaging.

Further, in the failure image of the dynamic image, all of the plurality of frames included in the dynamic image are not failures. Therefore, it is difficult to determine with one glance the reason why the dynamic image is considered to be a failure.

However, the techniques described in JP 2016-186736, JP 2017-035294, and JP 2017-144075 are for failure images in static images. Therefore, there is a necessity for improvement to make it easier to determine the reason for failure when the failure images of dynamic image are displayed.

SUMMARY

An object of the present invention is to be able to determine the reason for failure in the failure image of the dynamic image or the moving image easily as determining in the failure image of the static image when the user is confirming the failure images.

To achieve at least one of the abovementioned objects, according to an aspect of the present invention, an image display apparatus reflecting one aspect of the present invention includes a display which can display an image; and a hardware processor, wherein, the hardware processor obtains image data of a dynamic image or a moving image including a plurality of frames generated by a radiation imaging apparatus, and the hardware processor displays on the display as a failure image at least one failure frame included in the dynamic image or the moving image based on the obtained image data or analyzed image data obtained by analyzing the image data, the failure frame including a reason why the dynamic image or the moving image cannot be provided for diagnosis.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention.

FIG. 4 is a diagram showing an example of a dynamic image or a moving image which is displayed by the image display apparatus shown in FIG. 2.

DETAILED DESCRIPTION OF EMBODIMENTS

Hereinafter, one or more embodiments of the radiation imaging system and the radiation image imaging apparatus will be described with reference to the drawings. However, the scope of the invention is not limited to the disclosed embodiments.

First Embodiment

Figure 1:
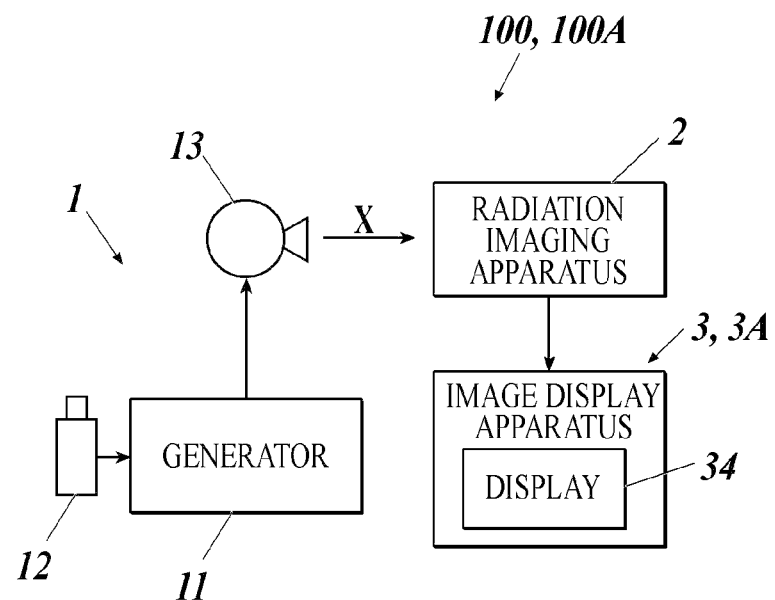
FIG. 1 is a block diagram showing a schematic configuration of a radiation imaging system according to a first and second embodiment.

First, a first embodiment is described.
[Radiation Imaging System]
The configuration of the radiation imaging system according to the present embodiment is described. FIG. 1 is a block diagram showing a schematic configuration of a radiation imaging system 100 according to the present embodiment.

Reference numerals shown in parenthesis in FIG. 1 are the reference numerals for the later-described second embodiment.

As shown in FIG. 1, the radiation imaging system 100 according to the present embodiment includes a radiation irradiating apparatus (hereinafter referred to as irradiating apparatus 1), a radiation imaging apparatus (hereinafter referred to as imaging apparatus 2), an image display apparatus 3, and the like.

The irradiating apparatus 1 includes a generator 11, an exposure switch 12, a radiation source 13, and the like.

In response to operation of the exposure switch 12, the generator 11 is able to apply to the radiation source 13 voltage according to the radiation irradiating condition (tube voltage, tube current, and irradiating time (mAs value), etc.) set in advance.

The radiation source 13 (tube) includes a rotating anode and filament which are not shown. When the voltage from the generator 11 is applied, an electron beam according to the voltage applied to the filament is irradiated toward the rotating anode. The rotating anode generates radiation X (X-ray) in an amount according to the strength of the electron beam.

FIG. 1 shows the units 11 to 13 as separate units, but these can be formed as one.

FIG. 1 shows the exposure switch 12 connected to the generator 11 but the exposure switch 12 can be provided in another apparatus (for example, an operating table which is not shown) connected to the generator 11.

Although illustration is omitted, the imaging apparatus 2 includes a sensor substrate including two-dimensionally (in a matrix) aligned pixels including a radiation detecting element which generates charge according to an amount of radiation by receiving radiation X and a switch element which performs accumulation and release of charge, a readout circuit which reads out an amount of charge released from each pixel as a signal value, a controller which generates image data from a plurality of signal values read out from the readout circuit, and an outputter which transmits to the outside generated image data by wired communication or wireless communication.

The imaging apparatus 2 may include a scintillator which converts the irradiated radiation X to light with other wavelengths such as a visible light, and charge may be generated according to the converted light (indirect type). Alternatively, the imaging apparatus 2 may directly generate charge from the radiation X without using the scintillator (direct type).

The irradiating apparatus 1 and the imaging apparatus 2 according to the present embodiment are able to perform dynamic imaging (also called serial imaging) of the subject.

The subject includes humans, animals, and structures, but the present invention assumes humans.

According to the dynamic imaging of the present embodiment, in response to one imaging operation (pressing of the exposure switch 12), the imaging apparatus 2 repeats accumulating of charge and readout of the signal value a plurality of times within a short period of time (for example, 15 times in one second) to repeatedly generate a string of a plurality of sets of image data based on the radiation irradiated from the irradiating apparatus 1.

While the imaging apparatus 2 repeats the accumulating of charge and the readout of the signal value, the irradiating apparatus 1 may continue to irradiate radiation or may repeatedly irradiate pulsed radiation to match with the operation of the imaging apparatus 2.

Below, the string of plurality of images obtained by dynamic imaging is referred to as a dynamic image, and each image included in the dynamic image is referred to as a frame F.

The image display apparatus 3 can communicate with the imaging apparatus 2 by wired communication or wireless communication. The image display apparatus 3 obtains the image data of the dynamic image generated by the imaging apparatus 2, and is able to display the frame F and the dynamic image based on the image data.

The image display apparatus 3 obtains the image data of the moving image generated by a fluoroscopic apparatus (not shown) other than the imaging apparatus 2, and is able to display the frame F and the moving image based on the image data.

The details of the image display apparatus 3 are described later.

[Image Display Apparatus]

Figure 2:
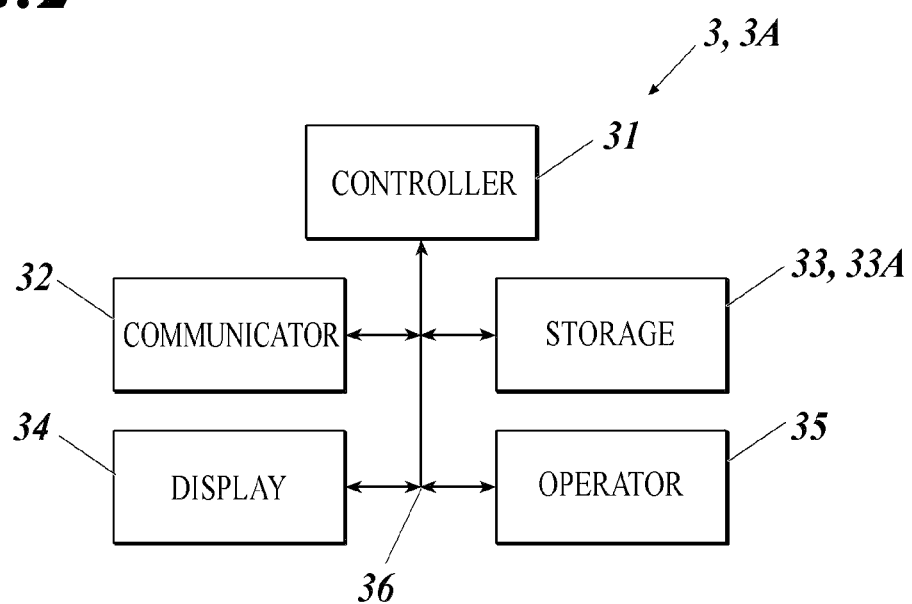
FIG. 2 is a block diagram showing a specific configuration of an image display apparatus included in the radiation imaging system shown in FIG. 1.

Next, the details of the image display apparatus 3 included in the radiation imaging system 100 are described. FIG. 2 is a block diagram showing a specific configuration of the image display apparatus 3. The reference numerals shown in the parenthesis in FIG. 2 are the reference numerals for the later-described second embodiment.

As shown in FIG. 2, the image display apparatus 3 includes a controller 31, a communicator 32, a storage 33, a display 34, an operator 35 and the like. The above units 31 to 35 are connected to each other by a bus 36.

The controller 31 centrally controls the operation of each unit of the image display apparatus 3 with the CPU, RAM, etc. Specifically, based on the operation signal input from the operator 35 and the various signals and data received from the imaging apparatus 2, various process programs stored in the storage 33 are read out and deployed in the RAM. The controller 31 performs various processes according to the process programs and controls the contents displayed on the display 34.

The communicator 32 includes a network interface. The communicator 32 transmits and receives data between external apparatuses connected through a communication network such as LAN, WAN, internet, etc. The communicator 32 may perform wireless communication using a mobile telephone line and may transmit and received data between the external apparatuses connected through the communication network.

The storage 33 includes a HDD (Hard Disk Drive), a semiconductor memory, and the like, and stores various process programs and parameters and files necessary to perform the programs.

The storage 33 is able to store image data (including image data of a later-described failure frame Ff) received from other apparatuses (for example, imaging apparatus 2, later-described console 4, PACS 130, etc.).

The storage 33 includes a database which manages the image data linked with imaging order information and additional information.

The display 34 is a monitor such as a LCD and displays various images according to the instruction of the display signal input from the controller 31.

The operator 35 includes a keyboard provided with various keys and a pointing device such as a mouse, and a touch panel layered on the display 34. The operator 35 outputs to the controller 31 the operation signal input according to the key operation on the keyboard, the mouse operation, and the position touched on the touch panel.

The controller 31 of the image display apparatus 3 as described above performs the following operation according to the process program stored in the storage 33.

For example, the controller 31 includes a function to obtain the image data of the dynamic image or the moving image (hereinafter referred to as dynamic image, etc.) including a plurality of frames F generated by the imaging apparatus 2.

According to the present embodiment, the data is obtained by receiving the data through the communicator 32.

Instead of directly obtaining the image data generated by the imaging apparatus 2, the imaging apparatus 2 can obtain data retrieved by other apparatuses such as the later-described console 4, PACS 130, etc.

The communicator 32 may be the input/output unit to which various media such as a USB memory can be connected and the image data may be obtained by reading from the media storing the image data.

The controller 31 includes a function to display on the display 34 at least one failure frame Ff as a failure image. Such failure frame is included in the dynamic image, etc. based on the obtained data or analysis data obtained by analyzing the obtained image data, and the failure frame includes a problem which is the reason that the failure frame Ff cannot be provided for diagnosis.

According to the present embodiment, among the plurality of frames F, the frame specified by the user (the person who images the subject or the person confirming the obtained frame F (the person who images the subject, the person interpreting the image, doctor, etc.)) is set as the failure frame Ff.

Figure 3A:
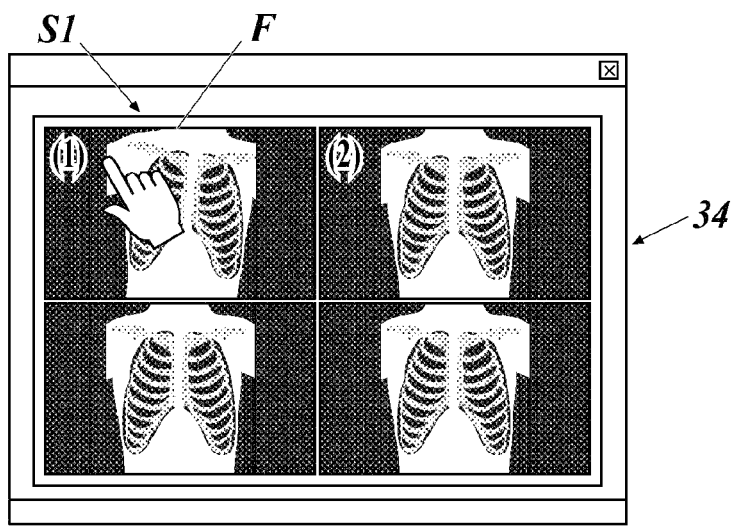
FIG. 3A, FIG. 3B, and FIG. 3C are diagrams showing an example of a setting process of a failure frame using the radiation imaging system according to the first embodiment.

The frame is specified as follows. The user checks whether the body of the subject moved or whether the irradiating condition of the radiation is suitable while watching the dynamic image, etc. based on the image data or the analyzed image data displayed on the image display screen S1 of the display 34. At the timing when the user believes the desired dynamic image, etc. is not obtained, for example, the subject is moving, the image is too dark (too bright), or there is a large amount of scattered radiation and the contrast is low, the user operates the operator 35 (clicks or touches the image) to specify the frame displayed at this point as the failure frame Ff as shown in FIG. 3A.

Figure 3B:
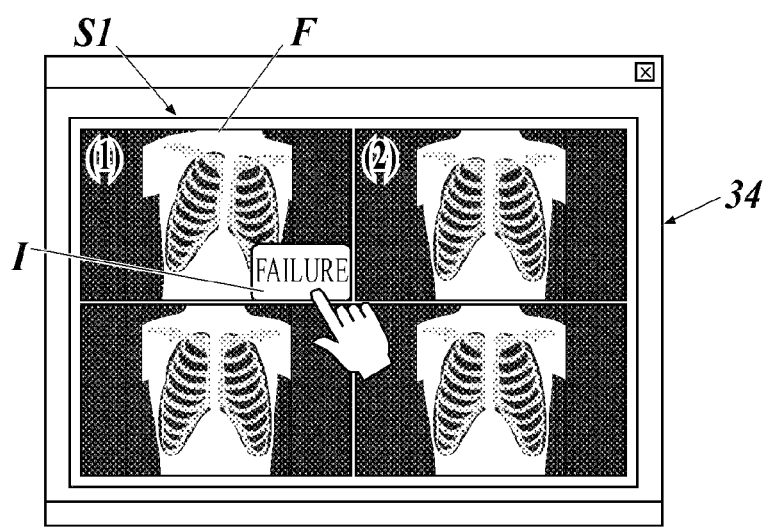

Alternatively, after the operation on the operator 35, the failure frame Ff can be specified after further operation to select whether to specify the frame F as the failure frame Ff (for example, click or touch the failure icon I), for example, as shown in FIG. 3B.

Figure 3C:
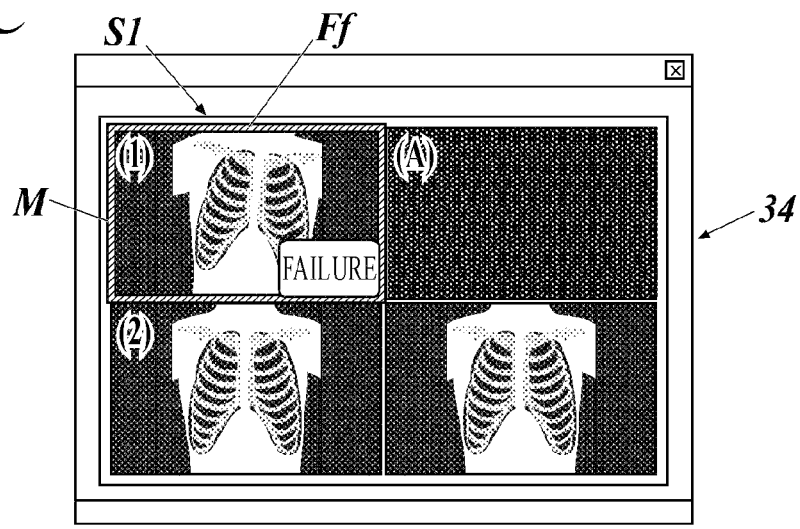

Alternatively, the mark M can be attached to the specified failure frame Ff (for example, as shown in FIG. 3C, surrounding with a border marked M) in order to display in a form different from the other frames F.

Alternatively, the failure frame Ff can be specified with another apparatus different from the image display apparatus 3 and the image data specified as the failure frame Ff can be obtained.

Then, the controller 31 displays on the display 34 the frame set as the failure frame Ff.

For example, the failure frame Ff may be displayed on the image display screen S1 of the display 34 from the beginning, or the first frame F of the dynamic image, etc. including the failure frame Ff may be displayed at first, and the display may be switched to the failure frame Ff when the predetermined pointing operation is performed on the first frame F.

When there are a plurality of failure frames Ff (for example, n frames to a total x frames (n<x)), one frame can be displayed as the representative, or the partial version dynamic image or partial moving image (hereinafter referred to as partial dynamic image, etc., see FIG. 4) shorter than the dynamic image, etc. including the plurality of failure frames Ff can be displayed on the display 34.

The timing that the failure frame Ff is displayed is not limited but the failure frame Ff can be displayed right after determining whether the frame F is the failure frame Ff. Alternatively, the image data of the failure frame Ff can be stored in the storage 33 after the determination, and the image data of the failure frame Ff can be read out from the storage 33 based on the instruction from the user to display the failure frame Ff based on the image data on the display 34.

According to the image display apparatus 3 of the present embodiment, when the user confirms the failure images, the user can easily determine the reason of the failure in the failure image of the dynamic image, etc. with the same easiness as the failure image of the static image.

Second Embodiment

Next, the second embodiment according to the present invention is described. The same reference numerals are applied to the configuration similar to the first embodiment and the description is omitted.

The radiation imaging system 100 according to the first embodiment displays the failure frame Ff which the user specified from the plurality of frames F on the image display apparatus 3. According to the radiation imaging system 100A of the present embodiment, the image display apparatus 3A automatically finds and displays the failure frame Ff from the plurality of frames F.

Therefore, the image display apparatus 3A according to the present embodiment is different from the image display apparatus 3 according to the first embodiment.

For example, the storage 33 according to the present embodiment stores a process program with some of the contents (described in detail later) different from the first embodiment.

The storage 33 stores the reference position to be compared with a body movement amount and a reference condition to be compared with an irradiated condition of the radiation.

The image display apparatus 3A according to the present embodiment does not need to receive the specifying of the failure frame Ff from the user. Therefore, the configuration corresponding to the operator 35 of the first embodiment does not need to be provided.

The controller 31 of the image display apparatus 3A according to the present embodiment including the configuration as described above performs the following operation which is different from the first embodiment due to some of the contents of the process programs being different from the first embodiment.

Specifically, the controller 31 does not include the function corresponding to the function to set the frame specified by the user as the failure frame Ff as described in the first embodiment.

Instead, the controller 31 includes the following function which is not included in the image display apparatus 3 of the first embodiment, the controller 31 analyzes the plurality of frames F included in the dynamic image, etc. based on the obtained data or the analyzed image data and determines whether each frame F is the failure frame Ff.

Specifically, at least either of the following (1), (2) is performed.

(1) The position of the subject and the predetermined reference position are compared in the plurality of frames F. If the position of the subject is separated from the reference position in a predetermined distance or more, the target frame is determined to be the failure frame Ff.

(2) The irradiating condition of the radiation is calculated from the pixel signal value and the calculated irradiating condition is compared with the predetermined reference condition in the plurality of frames F. If the irradiating condition is far from the reference condition in a predetermined value or more, the target frame is determined to be the failure frame Ff.

Then, the controller 31 displays on the display 34 the frame determined to be the failure frame Ff as the failure image.

By using the image display apparatus 3A according to the present embodiment, similar to using the image display apparatus 3 according to the first embodiment, when the user confirms the failure image, the user is able to easily determine the failure reason in the failure image of the dynamic image, etc. with the same easiness as determining the failure image of the static image.

According to the first and second embodiments, the controller 31 may include the function to display a mark indicating the failure frame Ff when the failure frame Ff is displayed on the display 34.

Preferably, in this case, the mark is displayed near the failure frame Ff.

For example, if the person different from the person who determined whether the frame F is the failure frame Ff or not confirms the failure frame Ff on the image display apparatus 3, it may not be possible to determine that it is the failure frame Ff at one glance. However, according to the above, it is possible to easily understand that it is the failure frame Ff.

Here, in order to discriminate the failure frame Ff more easily, the failure frame Ff can be displayed with a color different from the other frames F. Alternatively, the mark indicating the failure can be displayed differently. The display can be changed by changing the color or by blinking.

Other than the reason of failure, the display mark or the way of display can be changed.

If there are a plurality of reasons, the plurality of reasons may be shown.

The controller 31 of the first and second embodiments may include the function to display the total amount of exposure throughout the entire imaging period of the dynamic image, etc. including the failure frame Ff when the failure frame Ff is displayed on the display 34.

In this case, preferably, the total amount of exposure is displayed near the failure frame Ff.

The dynamic imaging is performed for a relatively long period of time and the amount of exposure on the subject becomes larger compared to static image imaging Therefore, the amount of exposure becomes an important issue of interest to the user, the person performing the diagnosis, and the subject. According to the above, it is possible to easily understand the degree of exposure at the time of imaging Therefore, it is possible to easily determine whether to perform the imaging again and when the imaging should be performed when the imaging is performed again.

Here, when the amount of exposure is displayed, in addition to the amount of exposure in the certain occasion of imaging, the following items can also be displayed, for example, the contents of imaging and the amount of time of imaging performed before and after the certain occasion of imaging, whether there is failure in the imaging and the reason for failure, the amount of exposure in the imaging, and the total amount of exposure in all occasions of imaging including the certain occasion of imaging and the imaging performed before and after.

According to the above, important issues of interest to the user and the person who performs the diagnosis including the contents of successive imaging on the subject, whether there is successive failure, whether the failure occurs successively for similar reasons, and the total amount of exposure can be easily understood and determined.

The controller 31 of the first and second embodiments may include the function to repeatedly play the partial dynamic image, etc. on the display 34 as shown in FIG. 4 when there are a plurality of failure frames Ff and these are displayed as the partial dynamic image, etc.

According to the above, when the failure reason such as a gradual body movement by the subject or a change in the radiation amount applies to a plurality of frames, the failure reason including the range of influence can be easily confirmed.

Here, when the partial dynamic image, etc. is displayed, it is possible to display on the display 34 which portion in the entire dynamic image, etc. is being played. For example, an entire bar corresponding to the length of playing the entire dynamic image can be displayed in the portion of the played partial dynamic image, etc., the partial bar corresponding to the length of playing the partial dynamic image, etc. can be displayed together with the entire bar so that it is possible to understand which portion of the entire dynamic image, etc. the played partial dynamic image, etc. belongs to. Further, a slit can be provided to show which portion of the entire bar or the portion bar is being played, and the slit can move matching with the playing.

When a plurality of failure frames F are scattered in one dynamic image, etc., each partial dynamic image may be repeatedly played on the display 34. When the plurality of failure frames Ff are scattered, a certain interval may be placed between playing each partial dynamic image, etc., so that it is possible to understand that the plurality of partial dynamic images, etc. are not one partial dynamic image, etc.

Usually, all of the frames F in the partial dynamic image, etc. determined to be the failure (hereinafter referred to as failure dynamic image, etc.) are not failure frames Ff, and some of the frames F in the failure dynamic image, etc. are determined to be the failure frame Ff. However, when the user confirms the failure dynamic image, etc., the user desires to confirm the frame f near the failure frame Ff determined to be the failure.

Therefore, the failure dynamic image, etc. may be extracted to include at least one frame F before and after the failure frame Ff determined to be the failure.

For example, in the example shown in FIG. 4, the user or the person who performs diagnosis, etc. confirms the obtained dynamic image, etc., determines that there is body movement when confirming the (m+α) th frame F (1<α<n), and specifies the frame F as the failure frame Ff. Here, the radiation imaging system 100 selects the m to n th frame F including the (m+α) th failure frame Ff and the frames F before and after, and this is displayed as described above as the failure dynamic image, etc. Therefore, the user confirms the failure dynamic image with the number of frames being m to n frames including not only the (m+α) th failure frame Ff but also the frames F before and after the failure frame Ff. With this, it is possible to easily confirm that the body movement occurred, and there may be cases in which it is possible to confirm the process that the body movement occurred.

The number of frames F before and after the failure frame Ff included when the radiation imaging system 100 extracts the failure dynamic image, etc. can be changed depending on the failure reason. With this, for example, when the movement before the failure frame Ff is important in the failure reason 1, the failure dynamic image, etc. can be extracted so that the number of frames F before the failure frame Ff is larger than the number of frames F after. When the movement after the failure frame Ff is important in the failure reason 2, the failure dynamic image, etc. can be extracted so that the number of frames Ff after the failure frame Ff is larger than the number of frames F before.

Figure 5A:
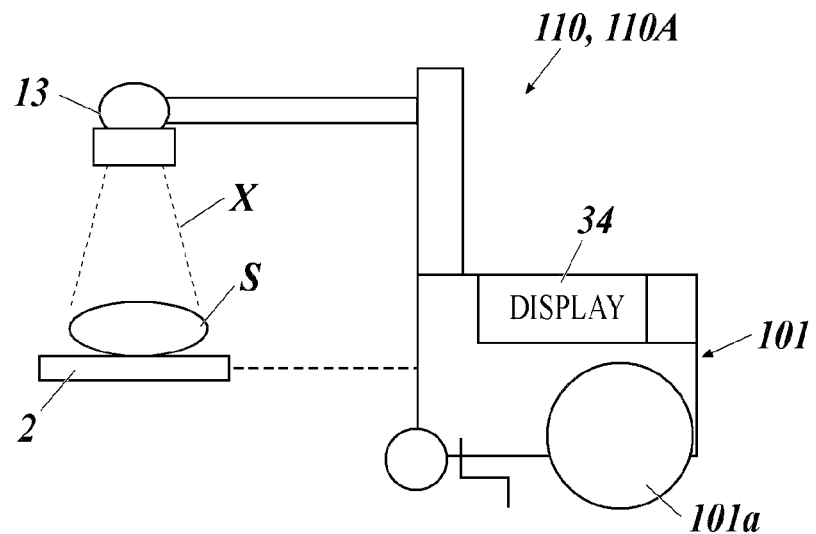
FIG. 5A is a side view specifically showing an example of how to use the radiation imaging system shown in FIG. 1.

The radiation imaging systems 100 and 100A can be used provided in the imaging room. Alternatively, for example, as shown in FIG. 5A, mobile diagnosis cars 110 and 110A can be used.

Specifically, a mobile diagnosis car main body 110*a* includes a case 101 provided with wheels 101*a*. The case 101 includes, an irradiating apparatus 1, an image display apparatus 3, a console 4, a mobile diagnosis car controller 102, a communicator 103, a power supply 104, and the like. The imaging apparatus 2 is a portable panel type. With this, the mobile diagnosis cars 110 and 110A can move.

Figure 5B:
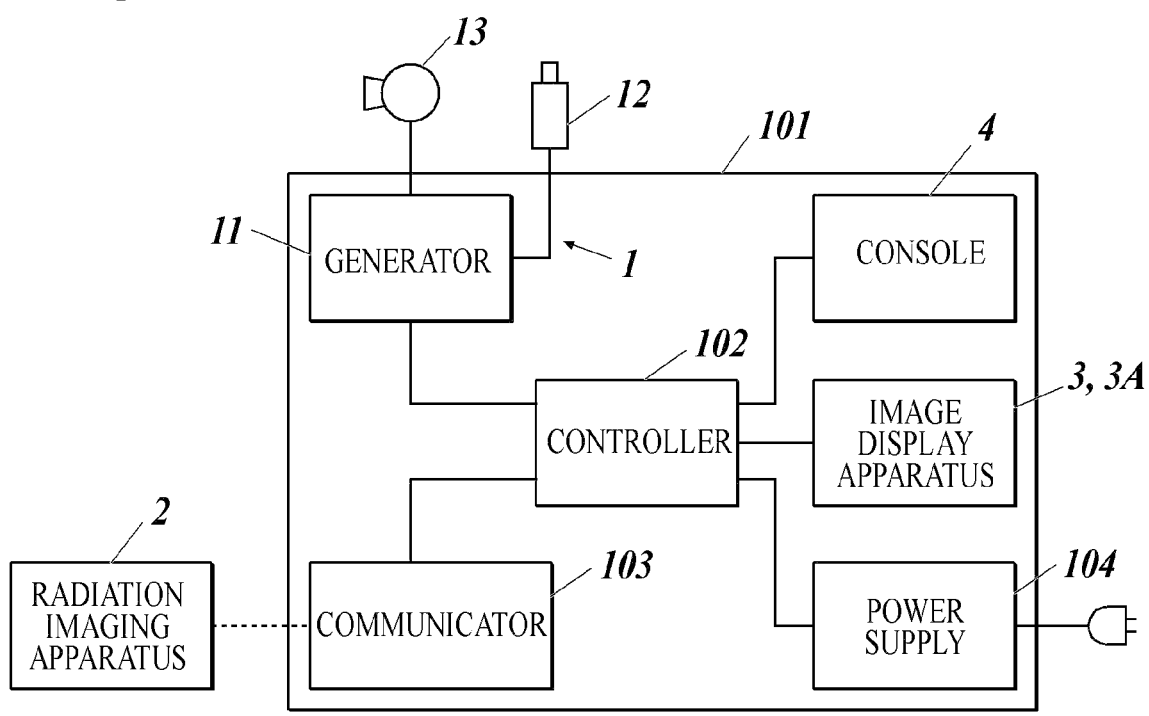
FIG. 5B is a block diagram showing a specific configuration of the radiation imaging system shown in FIG. 1.
Figure 6A:
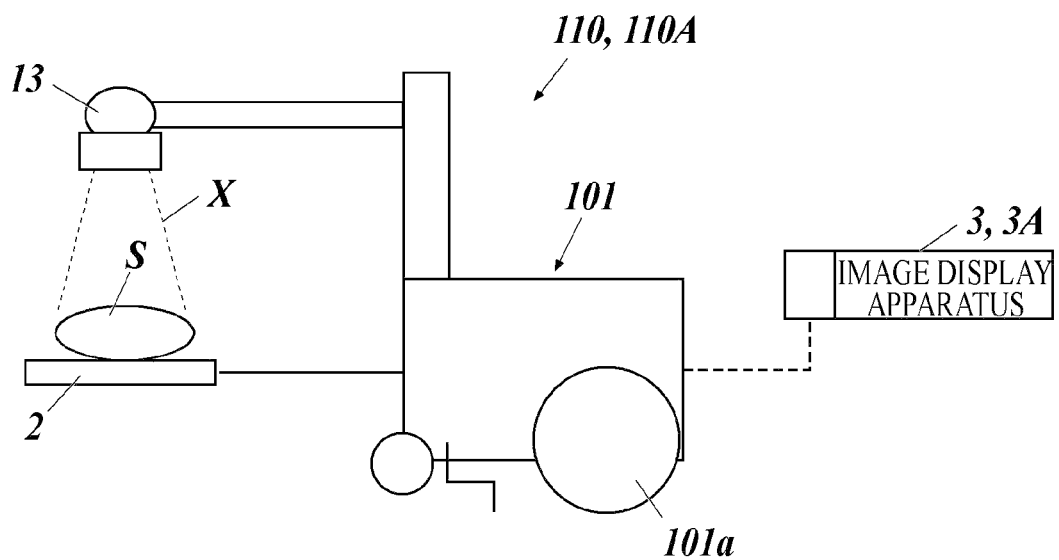
FIG. 6A is a side view showing another example of how to use the radiation imaging system shown in FIG. 1.
Figure 6B:
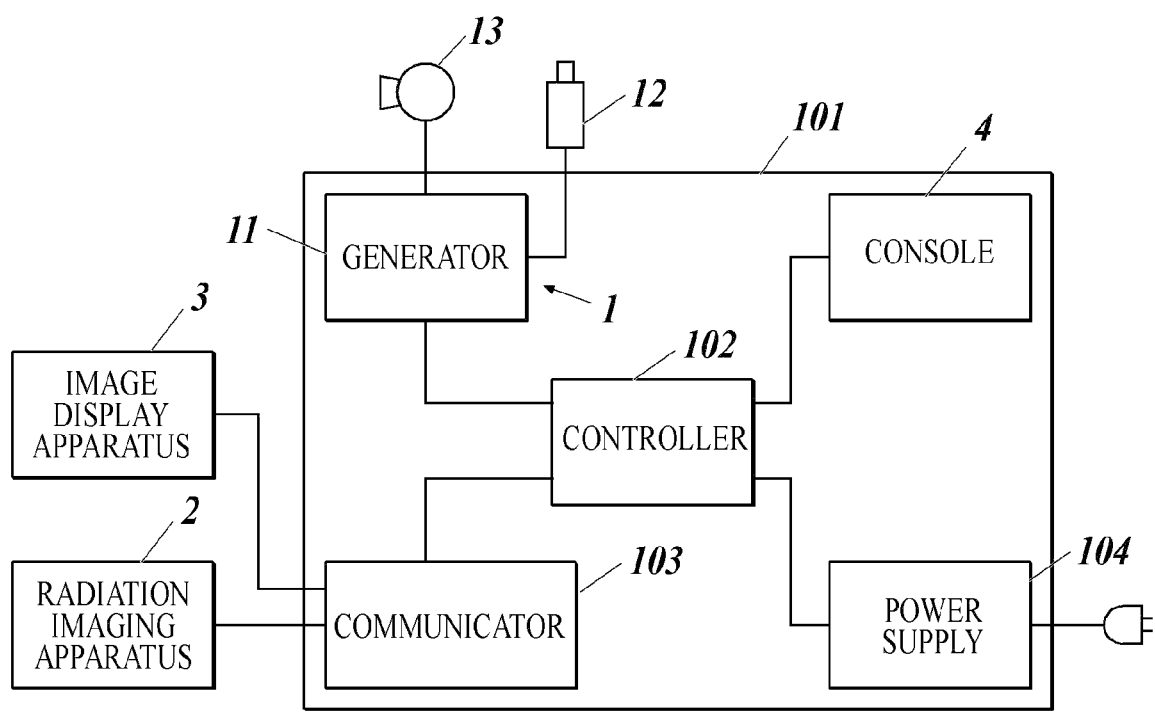
FIG. 6B is a block diagram showing another example of a specific configuration of the radiation imaging system shown in FIG. 1.

Here, the image display apparatuses 3, 3A can be formed as one with the mobile diagnosis car main body 110*a* as shown in FIG. 5B or can be formed separate from the mobile diagnosis car main body 110*a* as shown in FIG. 6A or FIG. 6B.

Figure 7:
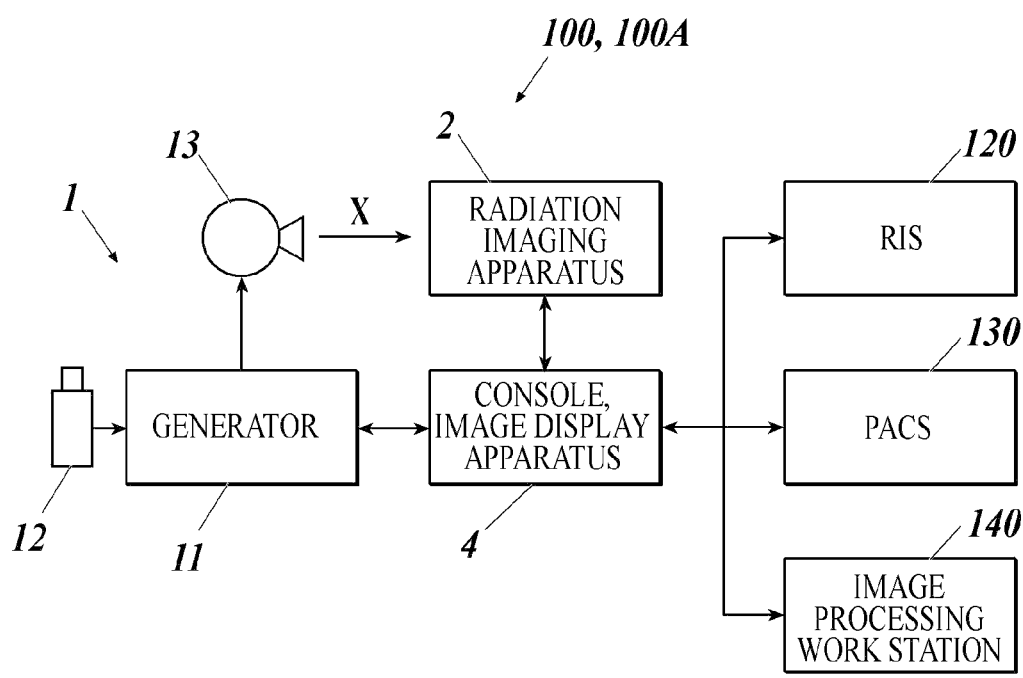
FIG. 7 is a block diagram showing a schematic configuration of a radiation imaging system according to a modification of the first and second embodiments.

As shown in FIG. 7, the image display apparatus 3 can be included in other apparatuses including a display such as the console 4 (or a dedicated analysis apparatus).

Here, a RIS 120 (Radiology Information System) which manages imaging order information, a PACS 130 (Picture Archiving and Communication System) which accumulates image data and a dedicated image processing work station (hereinafter referred to as image processing WS 140) which performs image processes on the dynamic image, etc. can be connected to the radiation imaging systems 100 and 100A.

Example 1

Next, new problems which may occur when the above-described embodiments are implemented and specific examples to solve such problems are described below.

[Display Method (1) of Static Image and Dynamic Image, Etc.]

In both the first and second embodiments, it is difficult to discriminate between the dynamic image, etc. and the static image displayed on the image display screen S1 shown in FIG. 3A, FIG. 3B or FIG. 3C.

In order to solve this problem, a mark showing that the image is a dynamic image, etc. or a static image can be attached to at least one of the dynamic image, etc. or the static image.

Alternatively, a frame surrounding one of the dynamic image, etc. or the static image can be colored to discriminate between the dynamic image, etc. and the static image.

[Display Method (2) of Static Image and Dynamic Image, Etc.]

When the dynamic image, etc. including a plurality of frames F is displayed on the image display screen S1 shown in FIG. 3A, FIG. 3B, or FIG. 3C, the most characteristic frame F matching the purpose of imaging the dynamic image, etc. is to be displayed. For example, when the dynamic image, etc. imaged for the purpose of confirming the state of lung ventilation is displayed, the frame F with the diaphragm in the lowest position or the highest position is displayed or the frame F imaging the rib cage in the most expanded state or the most reduced state is displayed.

The most characteristic frame F can be specified by the user on the image display screen S1 shown in FIG. 3A, FIG. 3B or FIG. 3C.

Alternatively, the frame F in which the technician who performed the imaging or the doctor who performed diagnosis determined to be the target of interest in the dynamic image, etc. and added the annotation can be used as the most characteristic frame.

Further, the characteristic frame F which is considered to be suitable based on the purpose of the imaging can be automatically extracted by image analysis and can be used as the most characteristic frame F.

[Display Method (3) of Static Image and Dynamic Image, Etc.]

In the image display screen S1 shown in FIG. 3A, FIG. 3B, or FIG. 3C, the dynamic image, etc. is played repeatedly in a stationary state and the discrimination from the static image becomes easy and the features of the dynamic image, etc. can be easily understood.

Figure 8:
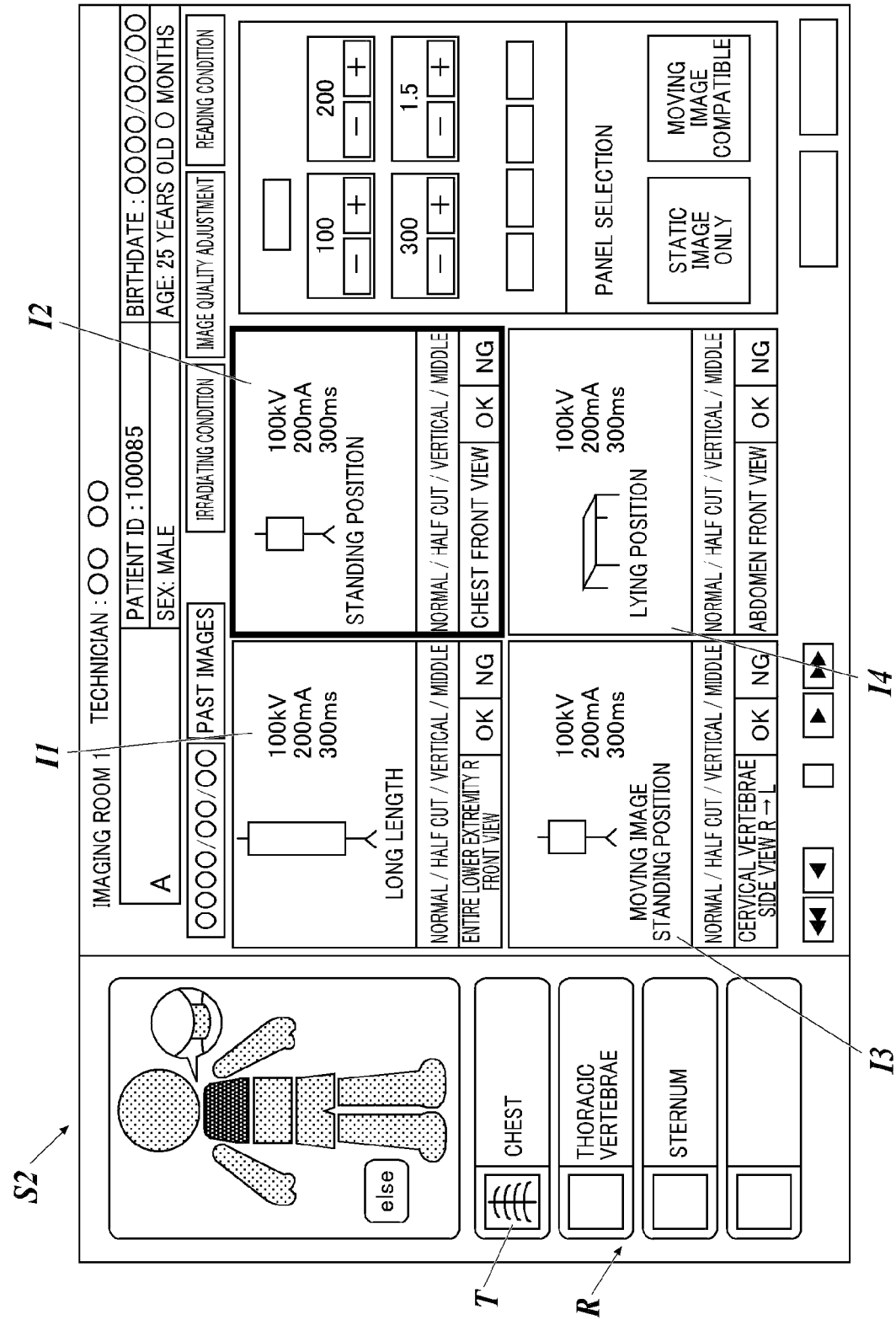
FIG. 8 is a diagram showing an example of a setting screen which is displayed by the image display apparatus shown in FIG. 2.

In the image display screen S1 shown in FIG. 3A, FIG. 3B, or FIG. 3C, and the display of the thumbnail T performed in a region in a portion of the setting screen S2 shown in FIG. 8 (FIG. 8 shows an example using the lower left, hereinafter referred to as thumbnail display region R) the repeated playing of the dynamic image, etc. can be started by the user pointing the imaged dynamic image, etc. (overlapping the pointer of the mouse, or touching the touch panel).

When the dynamic image, etc. is repeatedly played, instead of playing all of the frames F, only some of the frames F which match the purpose of playing may be played so as to be able to understand the features of the dynamic image, etc. within a short amount of time. The thumbnail T displayed in a static state before pointing can be displayed with a color different from the static image. After being pointed and the repeated playing starts, the thumbnail T can be changed to the same color as the static image. With this, the easiness of discrimination between the dynamic image, etc. and the static image is further enhanced.

When the dynamic image, etc. is continuously played in the stationary state, the speed of playing before pointing can be set to a speed different from the speed of playing after pointing. For example, before pointing, the speed of playing is slow to understand the features easily. After pointing, the speed of playing is the same as the actual live body of the target of imaging to promote a suitable diagnosis. With this, the convenience for the user is enhanced.

[Display Method (4) of Static Image and Dynamic Image, Etc.]

When the dynamic image, etc. is repeatedly played on the image display screen S1 shown in FIG. 3A, FIG. 3B, or FIG. 3C, the region of interest on a time axis (a plurality of frames F within a target term) can be displayed with an annotation. When the entire term of imaging is played, the annotation can be displayed only during the term of the above region of interest or the annotation can be displayed throughout the entire term of the imaging Here, as the annotation on the dynamic image, etc., the originally displayed contents are continuously displayed in the same position throughout the display term of the region of interest on the time axis.

The annotation can be displayed on only certain frames F instead of displaying the annotation throughout a plurality of frames F.

The display position of the annotation on the dynamic image, etc. can be specified by the user or can be set automatically in the region with the low degree of interest in which the movement of the structure is small.

The above-described region of interest on the time axis (plurality of frames F in the target term) can be set by the user. Alternatively, the region of interest on the time axis suitable for the purpose of imaging can be automatically set based on the results of image analysis of the movement of structures in the body during lung ventilation and the beat of the heart, for example.

[Display Method (5) of Static Image and Dynamic Image, Etc.]

In the image display screen S1 shown in FIG. 3A, FIG. 3B, or FIG. 3C, the convenience for the user is enhanced when the image is generated and adjusted or diagnosis is performed by displaying the static image and the dynamic image, etc. with a close relation to each other aligned with each other. Examples of such relation include the static image of the front chest and the dynamic image, etc. of the front chest, for example.

When the plurality of dynamic images, etc. obtained by imaging the same site in different terms are displayed, the dynamic images, etc. can be displayed in the order of the imaged term from old to new or new to old. With this, the convenience of the user is enhanced

[Process Method (1) of Static Image and Dynamic Image, Etc.]

In the image display screen S1 shown in FIG. 3A, FIG. 3B, or FIG. 3C, a different image process can be performed on each of the static image for the purpose of morphologic diagnosis (diagnosis by shadow of tumor, shape and density of imaged target) and the dynamic image, etc. for the purpose of functional diagnosis (diagnosis of movement of the imaged target such as the diaphragm or the rib cage). With this, diagnostic performance can be enhanced. For example, a process to enhance graininess and to decrease sharpness which is advantageous for functional diagnosis can be performed on the dynamic image, etc. Such process to make the movement of large structures in the body easier to see is effective. The process to emphasize edges of a structure in the body is also effective.

[Process Method (2) of Static Image and Dynamic Image, Etc.]

In order to display the dynamic image, etc. on the image display screen S1 shown in FIG. 3A, FIG. 3B, or FIG. 3C, the image display apparatuses 3 and 3A need at least a certain level of processing abilities, and free space is necessary in the storage. It is effective to decrease image quality of the dynamic image, etc. to have the spatial resolution (resolution) and the signal level resolution (gradation) necessary and sufficient for the functional diagnosis and then to perform the image process and the image display. The resolution of the space and the signal level can be decreased by the user specifying the suitable resolution to match the purpose of imaging the dynamic image, etc. or the resolution can be automatically set to a suitable value according to the purpose of imaging

[Display/Process Method (1) of Failure Dynamic Image, Etc.]

When the dynamic image, etc. considered to be a failure is displayed in the image display screen S1 shown in FIG. 3A, FIG. 3B, or FIG. 3C and the thumbnail display region R of the setting screen S2 shown in FIG. 8, at least one frame F clearly showing the failure reason is displayed. When there are a plurality of frames F showing the failure reason (for example, there is a problem in the positioning due to body movement throughout a plurality of frames F), the plurality of frames F are played repeatedly.

The mark, etc. showing failure is attached to at least one frame F which is the reason for failure. Therefore, it is possible to enhance the easiness of discriminating whether the dynamic image, etc. is considered to be the failure.

When the dynamic image, etc. in which the possibility that the radiation irradiating amount becomes large compared to the static image is high is considered to be the failure, and the failure dynamic image, etc. is displayed, the radiation irradiating amount (corresponding to the exposure amount of the patient) throughout the entire term of imaging is displayed together with the failure dynamic image, etc. With this, it is possible to provide the information which is necessary when the user determines whether the imaging is performed again and when the user sets the imaging conditions of the imaging to be performed again.

When the failure dynamic image, etc. is displayed on the image display screen S1 shown in FIG. 3A, FIG. 3B, or FIG. 3C and the thumbnail display region R of the setting screen S2 shown in FIG. 8, at least one failure frame Ff showing the failure reason is shown, and the failure reason is seen in a plurality of frames, the plurality of failure frames Ff are played repeatedly. With this, the user is able to easily understand the reason for the failure. The repeated playing of the plurality of failure frames Ff can be started when the user performs the operation of pointing on the image display screen S1.

[Display/Process Method (2) of Failure Dynamic Image, Etc.]

When the dynamic image, etc. imaged in the past is displayed for reference on the image display screen S1 shown in FIG. 3A, FIG. 3B or FIG. 3C and the thumbnail display region R of the setting screen S2 shown in FIG. 8, the reason for failure in the failure dynamic image, etc. imaged in the past can be easily understood by displaying the failure frame Ff showing the failure reason (repeated playing), attaching the mark, and displaying the amount of radiation.

[Display/Process Method (3) of Failure Dynamic Image, Etc.]

The user sets the failure frame Ff considering the positioning of the patient (whether there is a difference from the reference position, and the amount of the difference), the amount of radiation based on the purpose of imaging, quality of the lines influencing contrast, image quality appearing as graininess and sharpness, and suitability of spatial and temporal resolution of the imaging target while confirming by sight the dynamic image, etc. played on the image display screen S1 shown in FIG. 3A, FIG. 3B, or FIG. 3C.

For example, the setting of the failure frame Ff based on the suitability of the positioning of the patient can be performed by image analysis of the amount of displacement of the structure in the body during the imaging with relation to a reference position of the body structure as the imaging target exceeding a predetermined value.

The setting of the failure frame Ff based on the suitability of the radiation amount can be performed by the image analysis of the difference from the signal level as the reference exceeding a predetermined value in each frame F included in the dynamic image, etc.

The setting of the failure frame Ff based on the tube voltage of the irradiating apparatus 1 and the suitability of the radiation quality determined by the additional filter attached to the irradiating opening of the radiation source 13 can be performed by comparing the contrast in the region of interest in each frame F included in the dynamic image, etc. with the reference value. Further, the failure frame Ff can be automatically set by comparing the index showing image quality such as graininess, sharpness, and spatial resolution with the reference value.

The method of extracting the failure frame Ff when each frame F included in the dynamic image, etc. are considered to be static images is described. However, at least one failure frame Ff can be automatically set by analyzing elements of the time axis such as a movement amount of the imaging target in a certain unit of time, and a movement amount between frames F as the characteristics of the dynamic image, etc. including a plurality of frames F.

[Display/Process Method (4) of Failure Dynamic Image, Etc.]

The dynamic image, etc. considered to be the failure on the image display screen S1 shown in FIG. 3A, FIG. 3B, or FIG. 3C can be stored after the compression processing to suppress increase of the data storage amount.

In order to analyze the failure reason in detail later, only the failure frame Ff may be stored as is and the compression process may be performed on only the frames F other than the failure frame Ff or the frame F other than the failure frame Ff may be deleted and not stored in order to further decrease the stored amount.

[Display Method (1) of Imaging Order]

In the imaging order list (not shown) displayed on the console 4, the display format of the imaging order is differed between the imaging order including the imaging of the dynamic image, etc. (including only the dynamic image, etc. and the dynamic image, etc. and the static image in a mixed state) and the imaging order of only the static image imaging. With this, the user can make a plan in advance to cope with the difference in the positioning and the consumed time.

The method to differ the display format includes changing the color used on the imaging order list for the display of the imaging order including the imaging of the dynamic image, etc. and the imaging order for only the static image, or attaching the icon showing the type of imaging order in each display. It may be effective that the icon showing the order including the dynamic image, etc. includes the function to display animation.

[Display Method (2) of Imaging Order]

In the imaging order list (not shown) displayed on the console 4, in order for the user to be able to plan efficient imaging, it is effective to display the predicted amount of time necessary for imaging together with the display of the imaging order including the imaging of the dynamic image, etc. in which more imaging time is necessary compared to the imaging of the static image. Needless to say, the predicted amount of time necessary for imaging can be displayed on the display for the imaging order of only the static image.

The display of the imaging order including the imaging of the dynamic image, etc. can be displayed including the information to support the imaging such as the method of breathing during the imaging. If the imaging support information is displayed when the pointing is performed on the display of the imaging order, the problem regarding the display space does not occur.

The imaging support information can be displayed on the setting screen S2 shown in FIG. 8 displayed when the imaging order is executed.

[Processing Method of Imaging Order]

In the imaging order list (not shown) displayed on the console 4, the imaging order including the dynamic image, etc. and the imaging order including only the static image can be sorted (order of imaging can be rearranged) in order to be able to plan the imaging efficiently. Here, in order to plan efficient imaging, it is effective to classify the plurality of imaging orders including the imaging of the dynamic image, etc. in more detail according to the purpose of imaging which influences the technique of imaging. For example, the imaging order for the purpose of imaging the lung ventilation function and the imaging order for the purpose of imaging the movable state of the joint can be classified so that the imaging of the same type of dynamic imaging, etc. can be performed successively. With this, the preparation for imaging including providing the positioning jig and the instruction to the patient regarding the breathing during imaging can be efficiently performed.

When there is both an environment in which the dynamic image, etc. can be imaged and an environment in which only the static image can be imaged, the sorted imaging order can be distributed according to the environment suitable for the imaging. With this, the efficiency is enhanced.

Regarding the distribution of the imaging order to the environment suitable for the imaging, for example, there is a method in which the imaging order including the dynamic image, etc. can be obtained with only the console in the environment in which the dynamic image, etc. can be imaged. There is also a method to deliver from the system which delivers the imaging order such as the RIS to deliver the imaging order including the dynamic image, etc. to only the environment in which the dynamic image, etc. can be imaged. In either case, it is possible to prevent the inefficient situation such as the environment in which the dynamic image, etc. cannot be imaged obtaining the imaging order including the dynamic image, etc. or the imaging order including the dynamic image, etc. being delivered to an environment in which the dynamic image, etc. cannot be imaged.

[Promotion of Efficiency in Imaging by Sequence]

When both the static image and the dynamic image, etc. are mixed in one imaging order on the setting screen S2 shown in FIG. 8 (for example, a static image of the front view of the chest is imaged, then the dynamic image, etc. of the front view of the chest is imaged, then the static image is imaged in the lying position), the plurality of imaging included in one imaging order can be automatically sorted to perform efficient imaging.

When the imaging is performed, the suitable imaging apparatus is associated to the imaging of the dynamic image, etc. and the imaging of the static image. Specifically, when the imaging of the dynamic image, etc. is performed, the imaging apparatus which can image the dynamic image, etc. is set to be active in an imaging possible state. When the imaging of the static image is performed, the imaging apparatus which can image the static image is set to be active in an imaging possible state. When the imaging apparatus to match the purpose of imaging is selected, the size of the imaging apparatus is also considered.

It is effective to set the imaging sequence of the static image and the dynamic image, etc. according to the characteristics of the patient. For example, for elderly patients, the imaging of the static imaging is performed first, and then the imaging of the dynamic image, etc. which is tiring is performed. With this, it is possible to obtain a stable static image.

[Promotion of Efficiency in Imaging by Devices (1)]

When the imaging of the static image and the dynamic image, etc. is mixed in one imaging order, and the imaging apparatus suitable for each imaging is selected and used, an effective way to prevent erroneous operation and erroneous exposure on the patient is to be able to easily discriminate by sight the apparatus in which the dynamic image, etc. can be imaged and the apparatus in which only the static image can be imaged.

It is also effective to display the state of the imaging apparatus which can image the dynamic image, etc. on the imaging operation itself and the indicator of the console 4 when the imaging of the dynamic image, etc. is performed. It is also effective to display a warning that imaging cannot be performed when the imaging apparatus which cannot image the dynamic image, etc. is selected by mistake.

[Promotion of Efficiency in Imaging by Devices (2)]

An effective way to reduce the burden of the imaging operation on the user is to automatically link the automatic voice used for the purpose of instructing the method of breathing to the patient in the imaging of the dynamic image, etc. to the imaging (on when switching to the imaging of the dynamic image, etc. and off when switching to the imaging of the static image) when the imaging is switched between the imaging of the dynamic image, etc. and the imaging of the static image in one imaging order. Changing the contents of the automatic voice linked with the contents of imaging the dynamic image, etc. can also enhance the efficiency of imaging

[Promotion of Efficiency in Imaging by Devices (3)]

In many irradiating apparatuses 1, when the imaging is switched between the imaging of the static image and the imaging of the dynamic image, etc., the amount of radiation and the quality of radiation may need to be adjusted and the type of additional filter may need to be changed. It is a burden to the user to perform the operation of changing the additional filter suitably. If the user selects the wrong additional filter, the patient may be exposed to radiation which is not intended by the user, and there is a risk that suitable image data cannot be obtained.

In order to solve this problem, there is an effective function to automatically change the additional filter according to the purpose of imaging when the imaging is switched between the imaging of the static image and the imaging of the dynamic image, etc. Needless to say, it is effective to change the type of additional filter to match the purpose of imaging when the imaging of one static image is switched to imaging of another static image or the imaging of one dynamic image, etc. is switched to imaging of another dynamic image, etc.

In a system in which the additional filter cannot be switched automatically, an effective alternative solution may be to notify the user to change the additional filter or to notify that the additional filter does not match with the purpose of imaging.

[Selection of Imaging of Static Image, Imaging of Dynamic Image, etc. (1)]

A plurality of imaging apparatuses 2 with different sizes and abilities (resolution, etc.) are provided in the imaging room to perform the radiation imaging, and the suitable imaging apparatus is selected from the above and used. Specifically, for example, a setting screen S2 as shown in FIG. 8 is displayed on the display 34 of the image display apparatus and the display (not shown) of the console 4, and any one from the plurality of imaging menu images I1 to I4 is clicked or touched to make a selection.

A plurality of imaging apparatuses with different sizes and abilities may be loaded on the mobile diagnosis cars 110 and 110A used in rounds in the hospital and emergencies.

By roaming, an imaging apparatus may be used in an imaging room different from the imaging room in which the imaging apparatus is normally used or the imaging apparatus may be loaded on the mobile diagnosis cars 110 and 110A.

Under such conditions, the imaging apparatus 2 corresponding to the imaging of the dynamic image, etc. and the imaging apparatus which can only image the static image may exist. Therefore, there were incidents in which the imaging of the dynamic image, etc. was performed by the imaging apparatus dedicated to imaging of the static image and the subject was exposed to meaningless radiation.

In view of the above, when the imaging apparatus is registered in the radiation imaging systems 100 and 100A, it is determined whether the imaging apparatus is the imaging apparatus 2 which can perform the imaging of the dynamic image, etc. or the imaging apparatus dedicated to the imaging of the static image. Then, only if the imaging apparatus which is registered is the imaging apparatus 2 which can perform the imaging of the dynamic image, etc., the user is able to select either the moving image imaging menu or the static image imaging menu. In FIG. 8, all of the menu images I1 to I4 can be selected.

According to the above, the imaging apparatus dedicated to imaging the static image is not registered as the imaging apparatus 2 which can be used in the imaging of the dynamic image, etc. Therefore, it is possible to reliably prevent performing the imaging of the dynamic image, etc. with the combination in which the imaging of the dynamic image, etc. cannot be performed. With this, it is possible to prevent the subject from being exposed to meaningless radiation.

[Selection of Imaging of Static Image, Imaging of Dynamic Image, etc. (2)]

When both the imaging apparatus 2 which can image the moving image, etc. and the imaging apparatus which can only image the static image exist, the imaging of the dynamic image, etc. may be performed using the imaging apparatus 2 dedicated to imaging the static image, and the subject may be exposed to meaningless radiation. In view of the above, when the imaging apparatus is registered on the console 4, it is determined whether the imaging apparatus is the imaging apparatus 2 which can perform imaging of the dynamic image, etc. or the imaging apparatus dedicated to imaging the static image. If the imaging apparatus which is registered is the imaging apparatus dedicated to imaging the static image, one of the (1) to (4) listed below is performed.

(1) The dynamic imaging, etc. imaging menu image 13 is not displayed.

(2) The dynamic imaging, etc. imaging menu image 13 is displayed but cannot be selected (the color can be changed to gray, for example.)

(3) The dynamic image, etc. imaging menu image 13 may be selected but imaging cannot be performed.

(4) A warning is displayed showing that the dynamic image, etc. imaging menu cannot be selected because the imaging apparatus dedicated to imaging the static image is registered.

According to the above, the imaging apparatus dedicated to imaging the static image is not registered as the imaging apparatus 2 which can image the dynamic image, etc. Therefore, it is possible to reliably prevent performing the imaging of the dynamic image, etc. with the combination in which the imaging of the dynamic image, etc. cannot be performed. With this, it is possible to reliably prevent meaningless exposure of radiation to the subject.

[Selection of Imaging of Static Image, Imaging of Dynamic Image, etc. (3)]

When both the imaging apparatus 2 which can image the moving image, etc. and the imaging apparatus which can only image the static image exist, the imaging of the dynamic image, etc. may be performed using the imaging apparatus 2 dedicated to imaging the static image, and the subject may be exposed to meaningless radiation. In view of the above, when the imaging apparatus is registered in the console 4, it is determined whether the imaging apparatus is the imaging apparatus 2 which can image the dynamic image, etc. or the imaging apparatus which can image the static image. If the imaging apparatus dedicated to imaging the static image is registered but the user selects the imaging menu of the dynamic image, etc., the user is notified of the above by displaying a warning or by a warning sound. The imaging of the dynamic image, etc. (specifically, the irradiation of radiation) may be limited.

According to the above, the imaging apparatus dedicated to imaging the static image is not registered as the imaging apparatus 2 which can image the dynamic image, etc. Therefore, it is possible to reliably prevent imaging of the dynamic image, etc. in the combination in which the imaging of the dynamic image, etc. cannot be performed, and it is possible to reliably prevent meaningless exposure of radiation on the subject.

[Selection of Data Transmission (1)]

Since the amount of data of a moving image is large, the amount of time consumed to transmit the data may be large and trouble may occur in the network in the hospital when the image data of the dynamic image, etc. is transmitted by wireless communication in the network in the hospital.

In view of the above, the destination of transmitting the image data can be set individually according to the type of image data.

Figure 9:
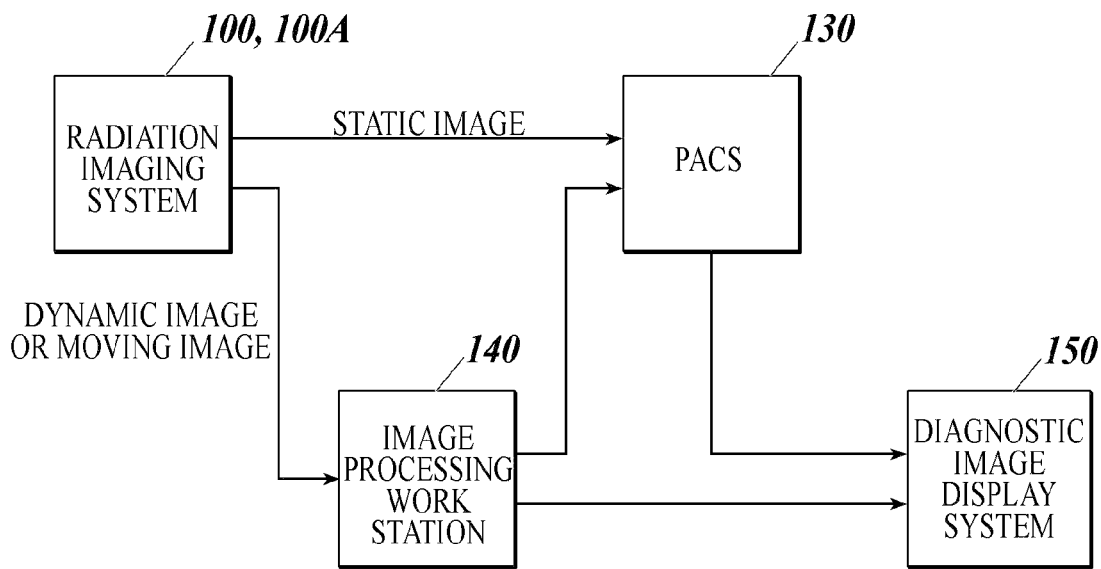
FIG. 9 is a block diagram showing an example of a transmitting method of image data to other apparatuses from the radiation imaging system shown in FIG. 1.

For example, as shown in FIG. 9, the destination for transmitting the image data of the dynamic image, etc. can be set to the image processing WS 140 and the destination for transmitting the image data of the static image can be set to the PACS 130. Then, the image data can be transmitted from the PACS 130 and the image processing WS 140 to the diagnostic image display system 150.

As described above, the transmitting suitable according to the data size of the image data can be performed. Therefore, it is possible to reliably prevent a large amount of time becoming necessary to transmit the image data and the trouble occurring in the network in the hospital.

[Selection of Data Transmission (2)]

When the image data of the dynamic image, etc. with the large amount of data is transmitted in the hospital network by wireless communication, the amount of time consumed to transmit the data may be large and trouble may occur in the network in the hospital. In view of the above, when the dynamic image, etc. and the static image are imaged as a set, the image data of the static image is transmitted to the image processing WS 140 together with the image data of the dynamic image, etc.

According to the above, the data amount of the image data of the static image is small, and there is no influence regardless of where the data is sent. Therefore, it is possible to reliably prevent a large amount of time becoming necessary to transmit the image data and the trouble occurring in the network in the hospital.

[Selection of Data Transmission (3)]

When the image data of the dynamic image, etc. with the large amount of data is transmitted in the hospital network by wireless communication, the amount of time consumed to transmit the data may be large and trouble may occur in the network in the hospital. In view of the above, the image data of the static image can be automatically transmitted to the PACS 130 wirelessly from the mobile diagnosis car 110 and 110A but the image data of the dynamic image, etc. may not be automatically transmitted.

Figure 10:
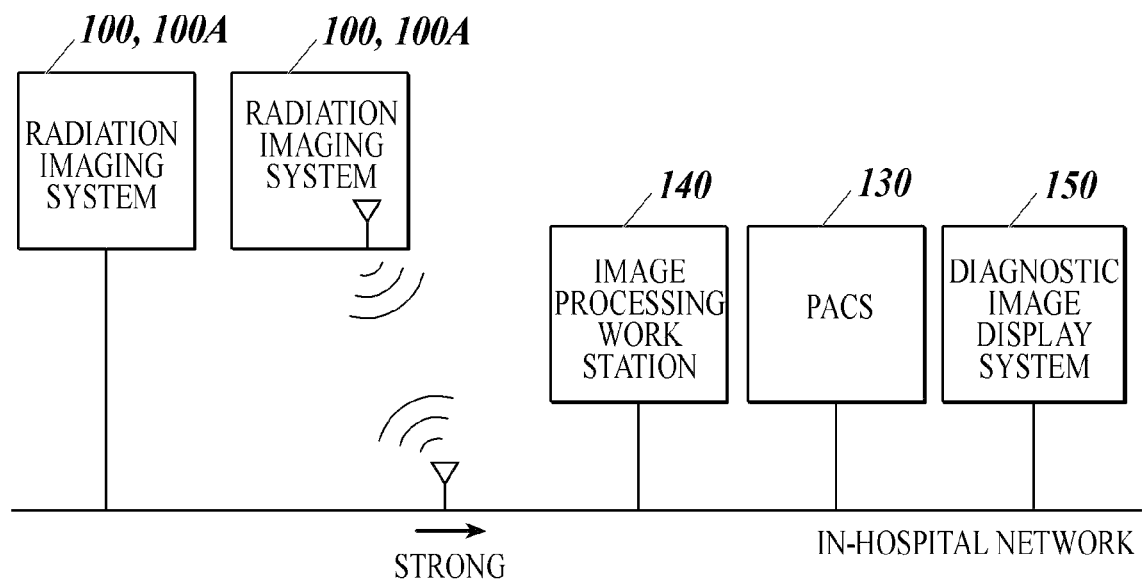
FIG. 10 is a block diagram showing another example of a transmitting method of image data to other apparatuses from the radiation imaging system shown in FIG. 1.

For example, as shown in FIG. 10, the image data of the dynamic image, etc. is transmitted when the console 4 of the mobile diagnosis car 110 and 110A is in a predetermined area or a predetermined network in the hospital, when the console 4 of the mobile diagnosis car 110 and 110A is in a predetermined wireless network, when the communication speed in the predetermined wireless communication network is a predetermined communication speed or faster, when the radio wave strength in the predetermined wireless communication network is a predetermined value or larger, or when the console 4 of the mobile diagnosis cars 110 and 110A are connected to the network in the hospital by wired communication.

According to the above, the transmission is performed suitably according to the data size of the image data. Therefore, it is possible to reliably prevent a large amount of time becoming necessary to transmit the image data and the trouble occurring in the network in the hospital.

[Selection of Data Transmission (4)]

When the image data of the dynamic image, etc. with the large amount of data is transmitted in the hospital network by wireless communication, the amount of time consumed to transmit the data may be large and trouble may occur in the network in the hospital. In view of the above, after the imaging of the dynamic image, etc. is performed, one or a plurality of frames F can be selected from the dynamic image, etc., only the image data of the selected frame F may be transmitted to the network in the hospital first, and the entire image data of the dynamic image, etc. may be transmitted after the console 4 of the mobile diagnosis cars 110 and 110A reaches the predetermined area or the predetermined wireless network or the console 4 of the mobile diagnosis cars 110 and 110A is connected to the network by wired communication.

Here, the destination of transmitting the image data of the selected frame F and the destination of transmitting the entire image data of the dynamic image, etc. can be selected.

For example, the destination of transmitting the image data of the frame F is to be PACS 130 similar to the static image and the destination of transmitting the entire image data of the dynamic image, etc. can be the image processing WS 140.

After the image process in the image processing WS 140 is complete, the processed image data is transmitted to the PACS 130, and the image data is replaced with the image data of the previously transmitted frame F.

According to the above, the image data is suitably transmitted according to the data size of the image data. Therefore, it is possible to reliably prevent a large amount of time becoming necessary to transmit the image data and the trouble occurring in the network in the hospital.

[Data Transmitting Method (1)]

Imaging of the dynamic image, etc. and the imaging of the static image may be performed successively on one subject. In such case, both the image data of the dynamic image, etc. and the image data of the static image exist in the radiation imaging system 100 after imaging.

Here, if the similar transmitting process is performed for the image data of the static image and the image data of the dynamic image, etc. without discriminating the type of data, the image data may have a large data amount and there may be a large burden on the network.

In view of the above, the original image data is stored in the imaging apparatus 2 during the imaging of the dynamic image, etc. Together with the above, the thinned image data with the data amount decreased from the original image data is generated and transmitted to the console wirelessly.

The original image data is transmitted when the apparatus is connected to the network in the hospital after imaging or when the console 4 of the mobile diagnosis car 110 and 110A are connected to the network by wired communication.

As the method to generate the thinned image data, there are methods such as to reduce the image resolution, to decrease the frame rate and thin the frame F, and to take out a short portion of the dynamic image, etc.

Such process to generate the thinned image data can be performed when wireless communication is performed.

According to the above, the image data is transmitted suitably according to the data size of the image data and it is possible to reliably prevent trouble occurring in the network of the hospital.

[Data Transmitting Method (2)]

If the similar transmitting process is performed for the image data of the static image and the image data of the dynamic image, etc. without discriminating the type of data, there may be a burden of the network due to the data amount of the image data being large. In view of the above, the thinned image data is transmitted wirelessly to the console 4 during the imaging when the image is the static image, and after imaging when the image is the dynamic image, etc.

The original image data is transmitted when the apparatus is connected to the network in the hospital after imaging or when the console 4 of the mobile diagnosis car 110 and 110A is connected to the network by wired communication.

As the method to generate the thinned image data, there are methods such as to reduce the image resolution.

According to the above, the image data is transmitted suitably according to the data size of the image data and it is possible to reliably prevent trouble occurring in the network of the hospital.

[Data Transmitting Method (3)]

Imaging of the dynamic image, etc. and the imaging of the static image may be performed successively for one subject. In such case, both the image data of the dynamic image, etc. and the image data of the static image exist in the radiation imaging system 100 after the imaging.

Here, if the similar image process is performed without discriminating the type of data between the image data of the static image and the image data of the dynamic image, etc., the image data may have a large data amount and a large amount of time may be necessary for the process in the imaging apparatus 2.

In view of the above, both the gain correction and the offset correction are performed with the imaging apparatus 2 on the static image and the gain correction and/or the offset correction is performed on the dynamic image, etc. with the console 4.

The gain correction and the offset correction can be performed in the unit of pixels, in the unit of readout lines, or on the entire image.

The offset correction value and the gain correction value can be stored in the storage of the console 4 in the unit of pixels, the unit of lines or the entire image for each imaging apparatus 2, and the correction performed on the console 4 is performed using the above correction values.

When the offset correction value and the gain correction value used for the correction on the imaging apparatus 2 is changed, the correction value is transmitted to the console 4, and the offset correction value and the gain correction value in the console 4 is overwritten.

The offset correction value and the gain correction value can be obtained by performing the imaging without the subject.

According to the above, the image processes are performed on the static image and the dynamic image, etc. with the processing apparatus (imaging apparatus 2 or console 4) including the suitable processing abilities. With this, it is possible to reliably prevent unnecessary time being wasted on the image process.

[Data Transmitting Method (4)]

Imaging of the dynamic image, etc. and the imaging of the static image may be performed successively on one subject. In such case, both the image data of the dynamic image, etc. and the image data of the static image exist in the radiation imaging system 100 after imaging.

Here, if the similar transmitting process and the image process are performed on the image data of the static image and the image data of the dynamic image, etc. without discriminating the type of data, since the image data may have a large data amount, a large amount of time may be necessary to perform the processing with the imaging apparatus 2, and a large amount of time may be necessary to transmit the image data and there may be a burden on the network.

In view of the above, the resolution of the dynamic image, etc. can be decreased more than the resolution of the static image.

According to the above, the process on the image data of the dynamic image, etc. becomes easy, and it is possible to prevent unnecessary time wasted on image processes and transmitting of image data. Further, it is possible to reliably prevent a burden on the network.

[Data Transmitting Method (5)]

Here, if the similar transmitting process and the image process is performed without discriminating the type of data between the image data of the static image and the image data of the dynamic image, etc., since the image data may have a large data amount, a large amount of time may be necessary to perform the processing with the imaging apparatus 2, and a large amount of time may be necessary to transmit the image data and there may be a burden on the network. In view of the above, the thinned image data of the dynamic image, etc. may be generated with a larger degree of thinning than the thinned image data of the static image.

According to the above, the process on the image data of the dynamic image, etc. becomes easy, and it is possible to prevent unnecessary time wasted on image processes and transmitting of image data. Further, it is possible to reliably prevent a burden on the network.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2018-164485, filed on Sep. 3, 2018, including description, claims, drawings and abstract is incorporated herein by reference in its entirety.

What is claimed is:

1. An image display apparatus comprising:
a display which can display an image; and
a hardware processor,
wherein, the hardware processor obtains image data of a dynamic image generated by irradiating radiation, the dynamic image including a plurality of frames generated by performing one dynamic imaging,
the hardware processor automatically sets at least one of the plurality of frames in the dynamic image or at least one of a plurality of frames in an analyzed image obtained by analyzing the image data of the dynamic image, as at least one failure frame by analyzing the plurality of frames included in the dynamic image or the plurality of frames included in the analyzed image, and the hardware processor displays on the display each the at least one of the plurality of frames in the dynamic image or each the at least one of the plurality of frames in the analyzed image as the at least one failure frame.

2. The image display apparatus according to claim 1, wherein, the hardware processor displays each the at least one of the plurality of frames in the dynamic image or each the at least one of the plurality of frames in the analyzed image as the at least one failure frame together with a mark indicating that the at least one of the plurality of frames in the dynamic image or the at least one of the plurality of frames in the analyzed image is a failure frame.

3. The image display apparatus according to claim 1, wherein the hardware processor displays the at least one failure frame on the display together with a total amount of exposure throughout an entire term of imaging the dynamic image including the at least one failure frame.

4. The image display apparatus according to claim 1, wherein, when the at least one failure frame includes a plurality of failure frames, the hardware processor repeatedly displays on the display a partial dynamic image which includes the plurality of failure frames and which is shorter than the dynamic image.

5. The image display apparatus according to claim 1, further comprising a storage which stores image data of the at least one failure frame,
wherein, the hardware processor reads the image data of the at least one failure frame from the storage according to an instruction from a user and displays the at least one failure frame based on the image data on the display.

6. The image display apparatus according to claim 1, wherein,
the hardware processor analyzes the plurality of frames included in the dynamic image or the plurality of frames included in the analyzed image by comparing a position of a subject with a predetermined reference position in each of the plurality of frames of the dynamic image or each of the plurality of frames of the analyzed image, and
if the position of the subject is separated a predetermined distance or more from the reference position in a target frame of the plurality of frames of the dynamic image or each of the plurality of frames of the analyzed image, the hardware processor automatically determines that the target frame is the failure frame.

7. The image display apparatus according to claim 1, wherein,
the hardware processor analyzes the plurality of frames included in the dynamic image or the plurality of frames included in the analyzed image by calculating an irradiating condition of the radiation from the pixel signal value in each of the plurality of frames of the dynamic image or each of the plurality of frames of the analyzed image and comparing the calculated irradiating condition with a predetermined reference condition, and
if the irradiating condition is different from the reference condition in a predetermined value or more in a target frame of the plurality of frames of the dynamic image or each of the plurality of frames of the analyzed image, the target frame is automatically determined to be the failure frame.

8. A radiation imaging system comprising:
a radiation irradiating apparatus which generates radiation;
a radiation imaging apparatus which, in response to one imaging operation, repeats accumulation of charge and readout of a signal value a plurality of times to repeatedly generate a plurality of sets of image data based on radiation irradiated from the radiation irradiating apparatus; and
an image display apparatus according to claim 1.

9. The image display apparatus according to claim 1, wherein the hardware processor displays the at least one failure frame with a characteristic that is different from a characteristic of others of the plurality of frames displayed by the hardware processor that are not the at least one failure frame.

10. The image display apparatus according to claim 1, wherein the hardware processor displays the at least one failure frame and at least another frame of the plurality of frames other than the at least one failure frame on a same screen.

11. The image display apparatus according to claim 10, wherein the at least another frame of the plurality of frames other than the at least one failure frame includes at least one of a frame immediately preceding the at least one failure frame in the dynamic image and a frame immediately succeeding the at least one failure frame in the dynamic image.

12. The image display apparatus according to claim 1, wherein the plurality of frames of the dynamic image are generated in an imaging apparatus by repeatedly accumulating a charge and reading out signal values a plurality of times in response to an imaging operation.

13. The image display apparatus according to claim 1, wherein the at least one failure frame is displayed showing a reason why the dynamic image cannot be provided for diagnosis.

14. A non-transitory storage medium storing a process program causing a hardware processor of an image display apparatus to perform the steps comprising:
obtaining image data of a dynamic image generated by irradiating radiation, the dynamic image including a plurality of frames generated by performing one dynamic imaging,
automatically setting at least one of the plurality of frames in the dynamic image or at least one of a plurality of frames in an analyzed image obtained by analyzing the image data of the dynamic image, as at least one failure frame by analyzing the plurality of frames included in the dynamic image or the plurality of frames included in the analyzed image, and
displaying on a display each the at least one of the plurality of frames in the dynamic image or each the at least one of the plurality of frames in the analyzed image as the at least one failure frame.

15. The image display apparatus according to claim 1, wherein the hardware processor displays a moving image based on the image data of the dynamic image.

16. The image display apparatus according to claim 1, wherein
the plurality of frames in the dynamic image or the plurality of frames in the analyzed image includes frames that are not failure frames; and
the hardware processor serially displays on the display a subset of the plurality of frames in the dynamic image or the plurality of frames in the analyzed image including the at least one failure frame and excluding at least one of the frames that are not failure frames.

17. The image display apparatus according to claim 1, wherein
  the plurality of frames in the dynamic image or the plurality of frames in the analyzed image includes frames that are not failure frames, and the hardware processor sequentially displays as a thumbnail or icon of the dynamic image or the analyzed image on the display a subset of the plurality of frames in the dynamic image or of the plurality of frames in the analyzed image including the at least one failure frame and excluding at least one of the frames that are not failure frames, whereby a user ascertains a reason for the failure.

18. The image display apparatus according to claim 17, wherein
  the hardware processor sequentially displays the subset of the plurality of frames in the dynamic image or of the plurality of frames in the analyzed image including the at least one failure frame and excluding at least one of the frames that are not failure frames in response to a user pointing the thumbnail of the dynamic image or the analyzed image.

\* \* \* \* \*